Patented July 31, 1934

1,968,032

UNITED STATES PATENT OFFICE 1,968,032

PREPARATION OF MONOETHERS OF GLYCOLS

Karl R. Edlund, Berkeley, Calif., assignor to Shell Development Company, San Francisco, Calif., a corporation of Delaware No Drawing. Application October 13, 1931, Serial No. 568,650

15 Claims. (Cl. 260—151)

This invention relates to the utilization of tertiary-base olefines (olefines which are capable of yielding tertiary alcohols upon hydration) and more specifically is concerned with the preparation of glycols containing a carbon atom attached to three other carbon atoms, said carbon atom being also attached to an oxygen atom which is linked to an alkyl, aryl, or aralkyl grouping.

I have found that olefines of the type

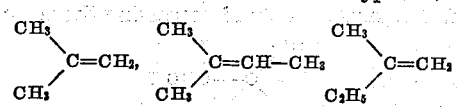

and the like which contain four, five, six or more carbon atoms to the molecule, can be converted to 2-monoethers which are suitable as commercial solvents either alone or in admixture with other solvents of the same type or with those in present industrial use. They constitute valuable solvents for many difficultly-soluble substances, particularly for gums, resins, lacquers and cellulose esters.

When reference is had to a 2-monoether of an iso-olefine glycol, it is intended to convey thereby a compound of the type

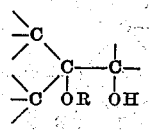

wherein R represents an alkyl, aryl or aralkyl grouping as methyl, ethyl, propyl, isopropyl, butyl, isobutyl, amyl, phenyl, benzyl or the like, and wherein the bonds on the carbon atoms are satisfied with a monovalent substituent such as hydrogen, alkyl groups or the like. Thus the compound

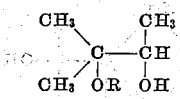

may be regarded as a 2-monoether of isobutylene glycol which has had a methyl grouping substituted for a hydrogen atom in the 1-position.

The process comprises treating the olefine oxide, corresponding to the tertiary-base olefine, with an alcohol, preferably one that is substantially anhydrous, in the presence of a suitable catalyst, such as a strongly ionizable acid of the order of $H_2SO_4$, $HNO_3$, $H_3PO_4$ or the like.

The olefine oxide can be prepared by reacting the tertiary-base olefine with an acid of the type HHalO wherein Hal represents chlorine, bromine or iodine, whereby the halogenohydrin is first formed as an intermediate product. The oxide is then prepared therefrom by treating the halogenohydrin with relatively concentrated NaOH or KOH at an elevated temperature—about 100° C. These methods are well known in the art.

By way of example only, reference will be had to the production of the monoethers of isobutylene glycol, although it is to be understood that the process is capable of being carried out with other members of the class described.

I 24 gms. of isobutylene oxide and 40 gms. of anhydrous methyl alcohol were reacted in the presence of a slight amount of 10% $H_2SO_4$ (2 drops). In order to assure more complete reaction, additional heating under a reflux condenser was necessary. Upon fractionation, a product was obtained of a boiling point of 142° C. at 765 mm. and a density of $$0.9311 \left(\frac{21}{4}\right)$$

It possessed the formula

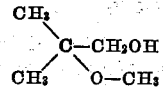

It is miscible with water, considerable heat being evolved. The viscosity is much less than that of the glycol. It may be distilled at ordinary pressure without decomposition if substantially no acid is present.

II

Isobutylene glycol 2-monoethyl ether was prepared in a manner similar to that for the 2-methyl ether, by reacting 25 parts by volume of isobutylene oxide with 35 parts by volume of substantially anhydrous ethyl alcohol in the presence of 1 drop of 10% $H_2SO_4$, the reaction being much less vigorous. It possessed the formula

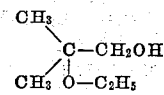

It has a boiling point of 147.8° C. and a density of $$0.9078 \left(\frac{21}{4}\right)$$

Its other properties are much the same as those of the 2-methyl ether.

A considerable excess of the alcohol may advantageously be employed to secure a more complete utilization of the olefine oxide, and to minimize the formation of undesired by-products. The ether is separated from the unconsumed reagents by fractional distillation, preferably after the neutralization of the acid catalyst.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the results attained. On the other hand, the invention is to be regarded as limited only by the terms of the accompanying claims, in which it is my intention to claim all novelty inherent therein as broadly as is possible in view of the prior art.

I claim as my invention:

1. The process for producing monoethers of tertiary-base olefine glycols, comprising: Reacting an iso-olefine oxide, containing more than three carbon atoms to the molecule, with an alcohol and recovering therefrom a compound of the type

wherein R represents an alkyl, aryl or aralkyl group, $x$ represents hydrogen or a hydrocarbon group and Y represents a hydrocarbon group which may be substituted.

2. Same as claim 1 wherein the reaction is conducted in the presence of a strong acid catalyst.

3. Same as claim 1, wherein the reaction is conducted in the presence of $H_2SO_4$.

4. The process for producing monoethers of tertiary-base olefine glycols, comprising: Reacting a compound of the type

wherein $x$ represents H or $CH_3$ with an alcohol and recovering therefrom a compound of the type

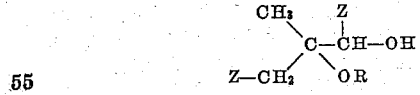

wherein R represents an alkyl, aryl or aralkyl group and Z represents H or $CH_3$.

5. The new compound possessing the formula:

wherein R represents an aryl, alkyl or aralkyl group, $x$ represents hydrogen or a hydrocarbon group and Y represents a hydrocarbon group which may be substituted.

6. The new compound possessing the formula:

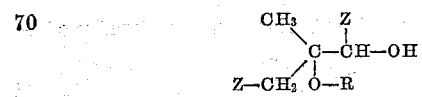

wherein R represents an alkyl, aryl, or aralkyl group and Z represents H or $CH_3$.

7. The new compound possessing the formula:

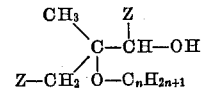

wherein Z represents H or $CH_3$ and $n$ represents an integer $=$ or $> 1$.

8. The new compound possessing the formula:

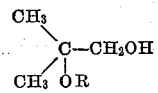

wherein R represents an alkyl, aryl or aralkyl group.

9. The new compound possessing the formula:

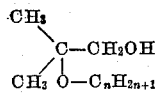

wherein $n$ represents an integer $=$ or $> 1$.

10. The new compound possessing the formula:

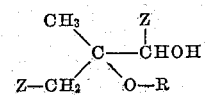

wherein R represents an alkyl, aryl or aralkyl group and Z represents H or $CH_3$, at least one Z representing $CH_3$ but not both Z simultaneously representing $CH_3$.

11. The new compound possessing the formula:

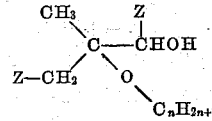

wherein Z represents H or $CH_3$, at least one Z representing $CH_3$ but not both Z simultaneously representing $CH_3$ and $n$ represents an integer $=$ or $> 1$.

12. The process for producing monoethers of tertiary-base olefine glycols, comprising: reacting an iso-olefine oxide, containing more than three carbon atoms to the molecule, with an alcohol and recovering therefrom a compound of the type

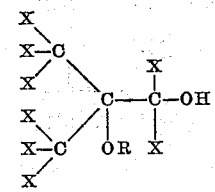

wherein R represents an alkyl, aryl or aralkyl group, and X represents hydrogen or an alkyl group.

13. The new compound possessing the formula:

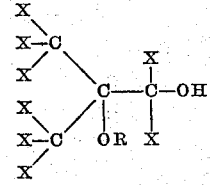

wherein R represents an aryl, alkyl, or aralkyl group, and X represents hydrogen or an alkyl group.

14. The new compound possessing the formula:

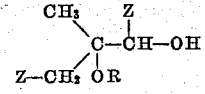

wherein R represents an alkyl, aryl or aralkyl group and Z represents hydrogen or an alkyl group.
15. The new compound possessing the formula:
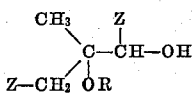
wherein R represents an alkyl, aryl or aralkyl group and Z represents hydrogen or an alkyl group, at least one Z representing an alkyl group but not both Z's simultaneously representing an alkyl group.
KARL R. EDLUND.